US011645697B2

(12) United States Patent
Nack et al.

(10) Patent No.: US 11,645,697 B2
(45) Date of Patent: May 9, 2023

(54) SIMPLE CHECKOUT

(71) Applicant: Comenity LLC, Columbus, OH (US)

(72) Inventors: David Nack, Bexley, OH (US); Ramesh Korra, Hilliard, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 509 days.

(21) Appl. No.: 15/452,308

(22) Filed: Mar. 7, 2017

(65) Prior Publication Data

US 2018/0101889 A1 Apr. 12, 2018

Related U.S. Application Data

(60) Provisional application No. 62/405,072, filed on Oct. 6, 2016.

(51) Int. Cl.
| | |
|---|---|
| *G06Q 30/06* | (2012.01) |
| *G06Q 20/12* | (2012.01) |
| *G06Q 20/20* | (2012.01) |
| *G06Q 20/24* | (2012.01) |
| *G06Q 20/40* | (2012.01) |
| *G06Q 30/02* | (2012.01) |
| *G06Q 30/0601* | (2023.01) |
| *G06Q 30/0207* | (2023.01) |

(52) U.S. Cl.
CPC ......... *G06Q 30/0633* (2013.01); *G06Q 20/12* (2013.01); *G06Q 20/204* (2013.01); *G06Q 20/24* (2013.01); *G06Q 20/40* (2013.01); *G06Q 30/0222* (2013.01)

(58) Field of Classification Search
CPC .. G06Q 30/0633; G06Q 20/12; G06Q 20/204; G06Q 20/24; G06Q 20/40; G06Q 30/0222
See application file for complete search history.

(56) References Cited

U.S. PATENT DOCUMENTS

| | | | | |
|---|---|---|---|---|
| 6,941,285 | B2 * | 9/2005 | Sarcanin | G06Q 20/105 |
| | | | | 705/67 |
| 7,562,818 | B1 * | 7/2009 | Bierbaum | G07B 15/02 |
| | | | | 235/375 |
| 8,636,203 | B1 * | 1/2014 | Patterson | G06Q 20/405 |
| | | | | 235/379 |
| 9,984,372 | B1 * | 5/2018 | Elrod | G06Q 20/405 |
| 2011/0153437 | A1 * | 6/2011 | Archer | G06Q 20/3278 |
| | | | | 705/17 |

(Continued)

OTHER PUBLICATIONS

Qasim, T; Siddiqui, S.; and Rehman, S. ur, "Interactive shopping with mobile wallet," World Congress on Sustainable Technologies (WCST-2012), London, 2012, pp. 32-36. URL: http://ieeexplore.ieee.org/stamp/stamp.jsp?tp=&arnumber=6482911&isnumber=6482899 (Year: 2012).*

(Continued)

*Primary Examiner* — Bennett M Sigmond
*Assistant Examiner* — Bolko M Hamerski

(57) ABSTRACT

A system and method for simple checkout is described. A computing device is used to access a website. The computing device receives a selection of an item to purchase at the retail website. The computing device provides purchase authorization information from the credit account app to a checkout of the retail website without the user providing account information for the credit account.

15 Claims, 4 Drawing Sheets

(56) References Cited

U.S. PATENT DOCUMENTS

| | | | |
|---|---|---|---|
| 2012/0253852 A1* | 10/2012 | Pourfallah | G06Q 20/405 705/4 |
| 2012/0265681 A1* | 10/2012 | Ross | G06Q 40/02 705/44 |
| 2012/0290449 A1* | 11/2012 | Mullen | G06Q 20/322 705/27.2 |
| 2013/0013499 A1* | 1/2013 | Kalgi | G06Q 20/36 705/41 |
| 2013/0138552 A1* | 5/2013 | Oskolkov | G06Q 20/24 705/38 |
| 2013/0166332 A1* | 6/2013 | Hammad | G06Q 20/12 705/5 |
| 2013/0173448 A1* | 7/2013 | Don | G06Q 20/02 705/38 |
| 2013/0191227 A1* | 7/2013 | Pasa | G06Q 20/367 705/14.73 |
| 2014/0058938 A1* | 2/2014 | McClung, III | G06Q 20/227 705/41 |
| 2014/0074637 A1* | 3/2014 | Hammad | G06Q 20/351 705/21 |
| 2014/0156392 A1* | 6/2014 | Ouimet | G06Q 30/0633 705/14.49 |
| 2014/0337175 A1* | 11/2014 | Katzin | G06Q 30/0623 705/26.62 |
| 2015/0019417 A1* | 1/2015 | Andrews | G06Q 20/363 705/41 |
| 2015/0026049 A1* | 1/2015 | Theurer | G06Q 20/227 705/41 |
| 2015/0088629 A1* | 3/2015 | Dubey | G06Q 20/12 705/14.23 |
| 2015/0220914 A1* | 8/2015 | Purves | G06Q 30/0633 705/41 |
| 2015/0227925 A1* | 8/2015 | Filler | G06Q 20/32 382/100 |
| 2016/0012445 A1* | 1/2016 | Villa-Real | G06Q 20/353 705/44 |
| 2016/0048864 A1* | 2/2016 | Beer | G06Q 30/0226 705/14.27 |
| 2017/0004588 A1* | 1/2017 | Isaacson | G06Q 20/065 |
| 2017/0300909 A1* | 10/2017 | Bansal | G06Q 20/3823 |
| 2018/0032996 A1* | 2/2018 | Phillips | G06Q 20/36 |

OTHER PUBLICATIONS

V.me by visa adds more top eCommerce retailers, simplifying checkout for consumers. (Oct. 15, 2012). Business Wire Retrieved from https://search.proquest.com/docview/1111874946?accountid=14753 (Year: 2012).*

Visa checkout introduces new interactive button for faster mobile commerce. (Mar. 11, 2016). Business Wire Retrieved from https://search.proquest.com/docview/1772111572?accountid=14753 (Year: 2016).*

K. G. Javkar, S. H. Vora, A. S. Rodge, J. Bose and H. Sharma, "Best offer recommendation service," 2016 International Conference on Advances in Computing, Communications and Informatics (ICACCI), 2016, pp. 2430-2436, doi: 10.1109/ICACCI.2016.7732421. (Year: 2016).*

* cited by examiner

SIMPLE CHECKOUT

CROSS-REFERENCE

This application claims priority to and benefit of co-pending U.S. Provisional Patent Application No. 62/405,072 filed on Oct. 6, 2016, entitled "SIMPLE CHECKOUT" by David Nack et al., and assigned to the assignee of the present application the disclosure of which is hereby incorporated herein by reference in its entirety.

BACKGROUND

Companies often use their websites and mobile applications to promote customer shopping, loyalty, sales, and related interaction. The website and mobile applications will include shopping hours for their brick-and-mortar stores, advertisements, coupons, rewards information, specials, directions, locations, product information, product availability, the ability to make purchases online and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
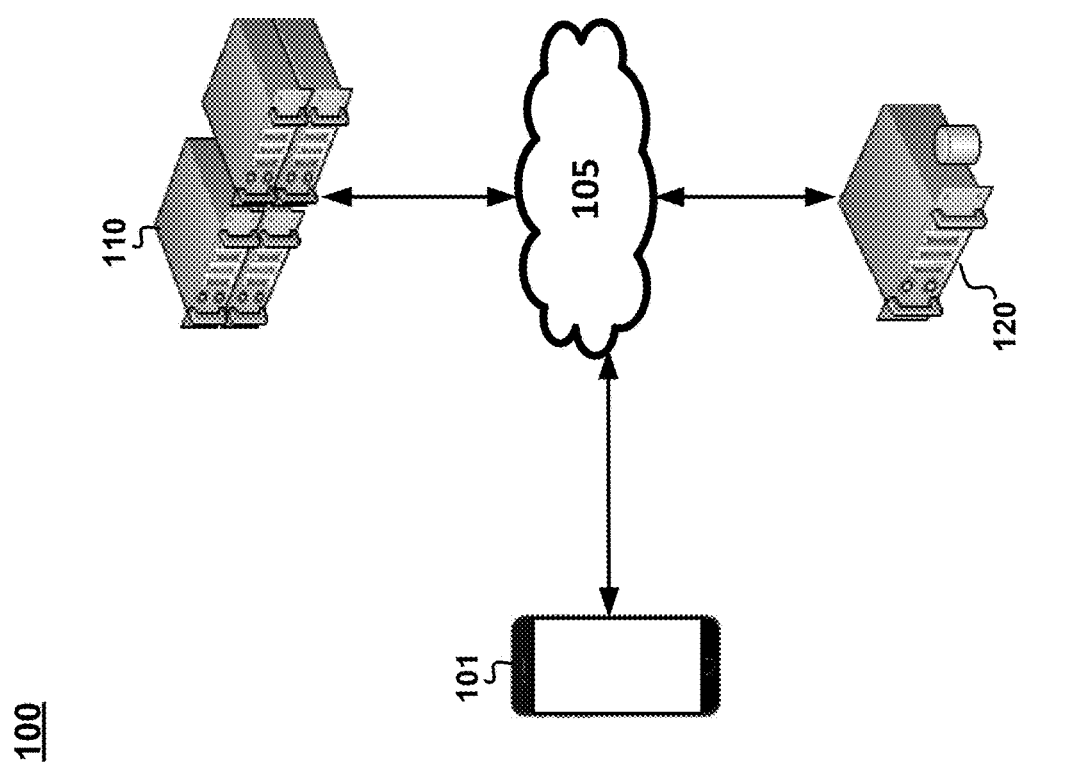
FIG. 1 depicts a system for simple checkout in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure information of the described embodiments.

NOTATION AND NOMENCLATURE

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Definitions

Account center-a customer facing portal providing credit account management functions.

Customer-a purchaser, consumer, or the like.

Credit provider (or Issuer)—a company that provides credit accounts for customers to use to make purchases.

Client—a retailer, merchant, retail store, or the like, that sells goods to customers and works with a credit account provider.

Credit account data—account specific data that includes information such as a credit account number, an expiration date, a card security code (CSC), or a card verification value (CVV).

Overview

Today, customers pay with multiple form factors, e.g., desktop, laptop, mobile device, cash register, etc. Simple checkout is an e-commerce payment service and loyalty engagement tool enabling brands to provide an easy and convenient way for private label members to pay for their online purchases without a card number. Customers simply enter their account center credentials to purchase with their private label credit account allowing for a quicker, and more pleasant, checkout experience. As a part of simple checkout, rewards information and credit account information such as available credit can be seamlessly integrated into the checkout experience to reinforce loyalty benefits and enable rewards redemption. Enabling one click (or low click or no clicks) features will allow the users to login without entering credit account specific information to further enhancing checkout experience.

In other words, a customer can use an authentication in lieu of account information such as an account number, an expiration date, a CSC, a CVV, or the like; to make a credit account purchase. By using a password or other authentication type instead of the account information, the account information is protected from view by another, enhancing security. Again, the account information stays secure because instead of customer inputting the account information onto ecommerce site, it is securely transferred over by the credit provider.

Operation

One embodiment may use a simple checkout web pop-up widget which is a client brand-able solution that works seamlessly with the retailer's brand. It allows retailers to increase brand awareness through the branded payment widget and drive tender towards their private label. Although a web pop-up widget example is used herein, the simple checkout system is well suited to utilizing a re-direct or modal capability to provide the simple checkout services In one embodiment, instead of being a widget on a web site, the simple checkout application is a native mobile application that is accessed in a native fashion. In yet another embodiment the simple checkout is a buy button, where the retail product(s) and payment service is bundled together and presented on other 3$^{rd}$ party sites. Clicking on the buy button will handle the selection and payment for the product simultaneously. In another embodiment, simple checkout application will work in an in-store fashion. For example, clicking on a simple checkout icon from the retailer application will render a customer's mobile virtual card, e.g., a 2D rendering, which can be scanned by the POS for the in-store purchase.

Importantly, the embodiments of the present invention, as will be described below, provide an approach for simple checkout which differs significantly from the conventional processes used by ecommerce applications. In conventional approaches, during a purchase transaction, much or all of the account data is entered by a user into the retailer's website. Often the account data would include account numbers, expiration dates, pin numbers, and the like that may be stored by the retailer website. As such, it is possible for the data to be hacked, stolen at a later time, viewed by a third party during the transaction or the like. However, the present embodiments, as will be described and explained below in detail, provide a previously unknown procedure to protect the financial account information from being stolen or illegally obtained while still allowing the user to make a purchase and still allowing the retailer to receive assurance from the financial account that valid card data was provided as part of the payment process. Thus, embodiments of the present invention provide an approach for simple checkout which extends well beyond what was previously done by hand or machine in the private label and co-brand credit card space.

For example, presently to checkout, the customer enters their card credentials and creates authentication on the merchant site or third party checkout solution. Thus, they just pass back the account information entered or setup by customer to the merchant to facilitate a purchase. As such, the customers had to setup and provide the account information on retailer site or present third party solutions. In contrast, in one embodiment, the customer has no need to setup and does not need to provide their account information. Instead, embodiments leverage the existing account management registration process without requiring a separate registration from customer primary account management registration.

Moreover, presently, a number of purchase aspects are not real time and do not utilize the latest account information. However, in one embodiment, since the present solution integrates directly into the issuer, embodiments provide the latest account number plus loyalty information real time. Thus, the technology benefits the customer as they don't have to go through set-up and the like. Similarly, the technology benefits the retailer as the embodiments can be branded and the technology works with the retailer side as well.

For example, one embodiment provides a plurality of two-party interactions for the purchase of the item. A first two-party interaction occurs between the user and the credit account app when the user makes a request for the purchase of an item at the retail web site. Then, a second two-party interaction occurs between the credit account app and the retail website to authorize the purchase and provide the payment card data or purchase authorization information from the credit account app to the checkout of the retail website.

Thus, under prior technology when a new card is issued, the customer must go back to any old accounts and update the card information to complete a purchase payment, etc. In contrast, embodiments described herein provide a seamless interaction that will resolve the new-card issued since the transaction occurs between the customer and the credit account issuer and the credit account issuer and the retailer. As such, the updated card information is received by the retailer from the credit account provider as a portion of the transaction and therefore, the actual credit account information remains the same even if the credit card account number has changed. In other words, one embodiment automatically provides real-time account information, including any changes to an account number due to an account number update (e.g., lost card, replaced card, account number change, expiration date change, etc.) when payment card data or purchase authorization information is provided from the credit account app to the retailer. Thus, no registration or setup change is required by either the customer or the retailer.

As will be described in detail, the various embodiments of the present invention do not merely implement conventional retail application processes on a computer. Instead, the various embodiments of the present invention, in part, provide a previously unknown procedure to seamlessly protect financial information within the metes and bounds of a purchase experience. Moreover, the present embodiments support the purchase experience without the user having to enter the underlying account data such as account numbers, expiration dates, pin numbers, and the like. Hence, embodiments of the present invention provide a novel process for simple checkout which is necessarily rooted in computer technology to overcome a problem specifically arising in the realm of financial account information ease of use and protection.

Moreover, the embodiments do not recite a mathematical algorithm; nor do they recite a fundamental economic or longstanding commercial practice. Instead, they address a business challenge of accurate and timely simple checkout with customer account information protection. Thus, the embodiments do not "merely recite the performance of some business practice known from the pre-Internet world along with the requirement to perform it on the Internet." Instead, the embodiments are necessarily rooted in retail and financial technology in order to overcome a problem specifically arising in the realm of account information theft.

With reference now to FIG. 1 a system 100 for simple checkout is shown in accordance with an embodiment. System 100 includes a computing device 101, a retail server 110, a financial server 120 and a network 105. In general, network 105 is a wireless communication network such as the Internet, WiFi, Cellular, Bluetooth, NFC, and the like.

For purposes of the discussion, computing device 101 may be a mobile computing device, notebook computing device, or desktop computing device. Example of mobile computing device include a mobile phone, a smart phone, a tablet, a smart watch, a piece of smart jewelry, smart glasses, or other user portable computational devices having wireless connectivity. That is, computing device 101 would be capable of broadcasting and receiving via network 105. In one embodiment, computing device 101 may have a positioning determining system. In another embodiment, computing device 101 may be able to determine location within a given radius, such as the broadcast range of a beacon, WiFi hotspot, overlapped area covered by a plurality of mobile telephone signal providers, or the like. In general, computing device 101 will have an operating system and one or more application operating thereon. In another embodiment, computing device 101 may be a desktop computer, a laptop computer or the like. One embodiment may utilize location detection. For example, location detection can be used to provide personalized service to customer, such as a store specific coupon or rebate. Location detection will also help with fraud detection. In one embodiment, fraud detection will interact with the issuer system such that customer and merchant can validate the user for security and fraud protection. In one embodiment, the fraud protection will allow multi factor authorization for either or both the customer and the merchant.

Retail server 110 maintains retail information such as sales, inventory, locations, and the like. Moreover, retail server 110 maintains customer information such as purchase information, order history, rewards points, loyalty rewards, savings offers, coupons, location information, goods searches, and the like. In one embodiment, computing device 101 accesses retail server 110 via network 105. In one embodiment, the retail server has the real time account information to provide a loyalty purchase.

Financial server 120 provides customer financial data such as their credit balance, remaining credit available, transaction history, rewards points, loyalty rewards, rewards certificates, money spent this month, prior purchases, and the like. In one embodiment, computing device 101 accesses financial server 120 on a secure channel via network 105.

Figure 2:
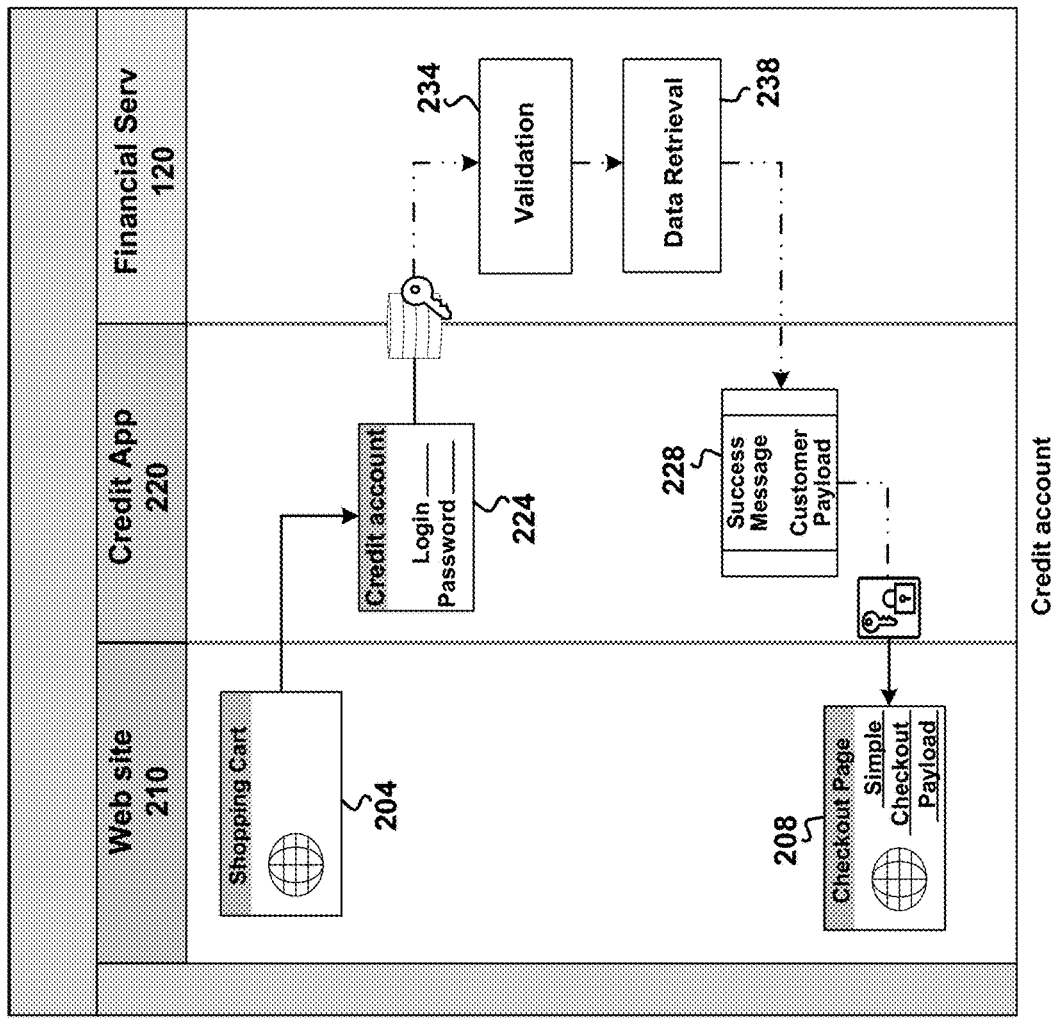
FIG. 2 is a flow diagram of the simple checkout interaction in accordance with an embodiment.

Referring now to FIG. 2, a flow diagram of the simple checkout system 200 is shown in accordance with an embodiment. Simple checkout system 200 includes ecommerce website 210, credit app 220 and financial server 120. Although a plurality of sections is shown, it should be appreciated that the different sections are provided for purposes of example and clarity. It is possible that one or more of the sections may differ in information or order from what is actually shown based on personal preference, legislation, retail application preference, credit app preference, and the like.

In general, simple checkout system 200 provides a sign-in service to pay for online shopping purchases using a brand's private label card. After a quick "just in time" setup or if already setup thru other account management channels, customers can retrieve account information without having to remember their account information. Whether at home or on the go, simple checkout system 200 works across multiple devices so online shopping is easy.

Figure 3:
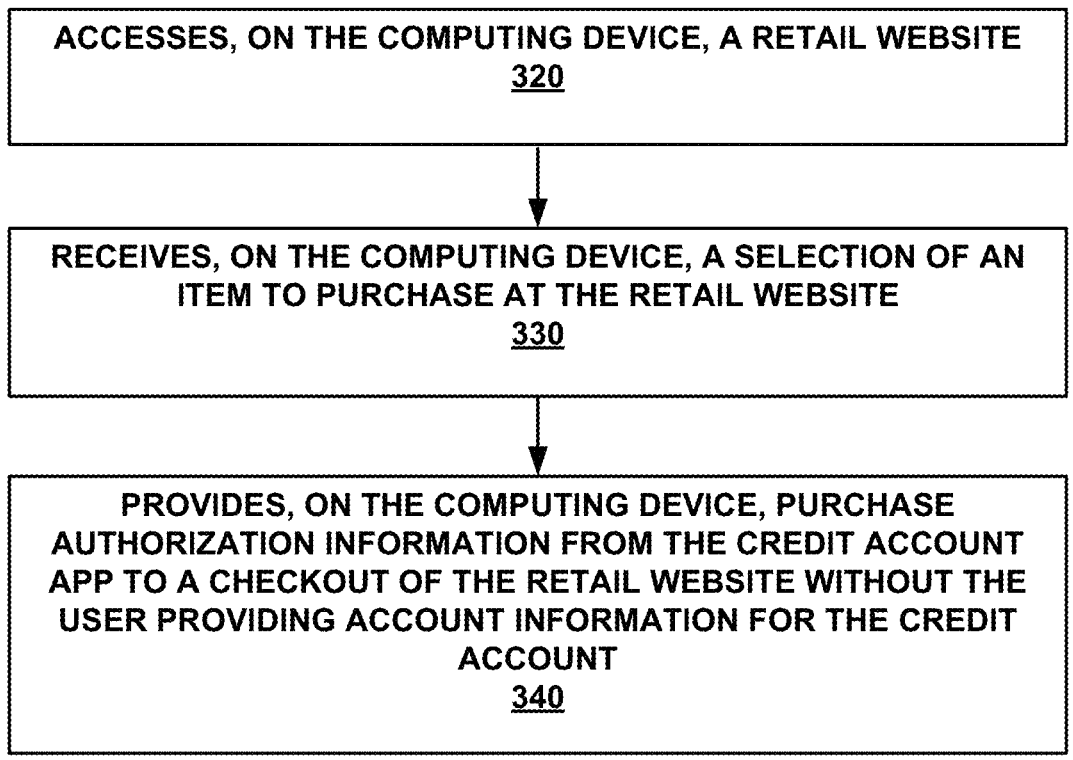
FIG. 3 depicts a flow diagram for a method for simple checkout in accordance with an embodiment.

With reference now to FIG. 3, a flow diagram 300 of a method for simple checkout is shown. With reference now to 320 of FIG. 3 and FIG. 2, one embodiment accesses, on the computing device, a retail website. In one embodiment, the user selects the retail website from a plurality of brand partner sites. For example, if the user is using a branded credit account the card may be good for a number of retailers that have affiliated themselves with the brand partner.

In one embodiment, the simple checkout system 200 incorporates a button into the shopping cart 204 section of website 210. An example of the code for configuring the button installation includes:

```
// The root URL for Simple Checkout with client name in the path (e.g.
https://checkout.comenity.net/aspire)
var adsLoginUrl = '${simpleCheckoutURL}';
// The service endpoint to which Simple Checkout should POST account
data (e.g. https://aspire.com/services/receiveAccountData)
var callbackUrl = '${callBackURL}';
// Some unique value to identify the customer's current session. This
will be sent back as part of the account data payload.
var sessionKey = '${sessionID}';
// A function to be called when the Simple Checkout process completes
or is canceled (upon the popup closing).
```

-continued

```
popupCloseAction = function( ) {
        window.location.href = window.location.pathname +
"?simpleCheckout";};
// Attach popup. Show to the appropriate event
window.addEventListener('load', function( ) {
        document.getElementById('simple-checkout-button').
addEventListener('click', function ( ) {
                popup.show(adsLoginUrl, callbackUrl, sessionKey,
                popupCloseAction);
        });
});
```

Sample configuration and setup files include:

| sampleUsage.html | <example implementation of HTML> |
| simpleCheckout.js | <example implementation for JavaScript> |
| style-sheet.css | <color and style configurable items> |

In addition, branding details may be developed from a template that may include a number of details such as: a display name, allowed domains, brand logo, color scheme, simple checkout system 200 name, payload URL, and the like.

With reference now to 330 of FIG. 3 and FIG. 2, one embodiment receives, on the computing device, a selection of an item to purchase at the retail website. At that time, if the user has not already done so, the user accesses log-in 224 to log into the credit app 220. In one embodiment, the user is directed to log into the credit app 220 after they click the checkout button with the simple checkout system 200 incorporated therein. In another embodiment, when the user begins the checkout process, a call on the user's computing device initiates the credit app 220 interaction with the website 210. Moreover, although the log in 224 to the credit app 220 is shown as happening after the shopping cart button is selected; the credit app 220 is well suited to having the user log-in 224 prior to the cart 204 or even the accessing of website 210. Thus, as a user switches to different tabs, e.g., different retail sites, the user will remain logged in to credit app 220 and not need to repeat the log-in 224 process.

After the successful login 224 by credit app, the payment request is delegated to financial server 120 for further validation 234 and account data retrieval 238.

With reference now to 340 of FIG. 3 and FIG. 2, one embodiment provides payment card data or purchase authorization information from the credit account app to a checkout of the retail website without the user providing account information for the credit account directly to merchant.

For example, data retrieval 238 does a look up of the customer information and retrieves the payment card data or performs authorization which will be needed by the retailer to complete the purchase. This information is sent to credit app 220. Credit app further generates an encrypted customer payload 228 that is passed back to Retailer site 210.

In one embodiment, the payload is encrypted using the OpenPGP standard, and can be decrypted using any OpenPGP-compliant library or tool on the retail server. Below is a sample implementation library for decrypting encrypted customer payload data:

Checkout-security-0.5.jar <PGP decryption library>

In general, PGP allows for a digital signature. Signing the encrypted message with a private key provides a way for the recipient of the message to see if the content has been changed. For example, if a letter in the message is changed before its decrypted, the signature will be invalidated. One example of the encrypted customer payload 228 passed from credit app 220 to checkout page 208 is

```
{
    "data":"hQEMAwDtq3RRAmjpAQf6Ap5V8Eg+
wBmxifILOnnLqsPlndhmXtRUS/FY2
gb4zKwJgCAMbFnRgynfUI . . .",
}
```

Once encrypted customer payload 228 is received at retail site 210, the payload is decrypted and validated. The decrypted customer payload contains the payment data that allows the customer to purchase the objects in the cart without needing to enter any financial information. One example of the decryption code includes:

```
private String decryptPayload(String encryptedPayload)
    throws IOException {
    SecurityDecrypt
        decryptor=SecurityFactory.getDecryptorInstance
            ("PGP");
    ObjectMapper mapper=new ObjectMapper( );
    String decryptedPayload="";
    String encryptedData=
        mapper.readTree(encryptedPayload).path("data").get-
TextValue( );
    String signature=
        mapper.readTree(encryptedPayload).path("signature").
getTextValue( );
    String timestamp=
        mapper.readTree(encryptedPayload).path("timestamp").
getTextValue( );
    String encryptionBundleKeyFileName="default";
    try {
        decryptedPayload=decryptor.decrypt(encryptedData, sig-
            nature, timestamp,
            clientID);
    } catch (Exception e) {
        logger.log(Level.SEVERE,    MessageFormat.format
            ("Unable to decrypt
account data :
{0}", encryptedPayload), e);
    }
}
```

In one embodiment, the decrypted payload may include information such as a session key, account information, contact information and reward information. Account information may include the account number, available credit and the like. Contact information may include name, billing address, email, phone numbers, and the like. Rewards information may include a program name, program points, program level and the like. An example of customer data in the payload includes:

```
{
    "sessionKey": "3E0959123DCC0E7FC8E225C93ED0BBD3",
    "accountData": {
        "accountNumber": 1231231235,
        "name": {
            "title": "Mrs.",
            "first": "Jane",
            "last": "Doe"
        },
        "address": {
            "addressLine1": "33 Tamarac Blvd",
            "city": "San Francisco",
            "state": "CA",
            "zipCode": "94109",
            "countryCode": "US"
        },
        "phoneList": [
            {
```

-continued

```
                "areaCode": "740",
                "exchange": "555",
                "line": "9652",
                "type": "home"
            },
            {
                "areaCode": "614",
                "exchange": "555",
                "line": "4000",
                "type": "work"
            },
            {
                "areaCode": "614",
                "exchange": "555",
                "line": "2068",
                "type": "other"
            },
            {
                "areaCode": "614",
                "exchange": "555",
                "line": "9087",
                "type": "cell"
            }
        ],
        "email": "Jane.doe@gmail1.com",
        "customerRewardsData": {
            "programName": "Aspire Rewards",
            "programCurrencyType": "POINTS",
            "currentTotalPoints": 135,
            "currentTotalPointsDate": "2013-06-15T00:00:00-04:00",
            "currentLevelDescription": "Preferred",
            "pointsToMaintainCurrentLevel": 650,
            "nextLevelDescription": "Platinum",
            "pointsToNextLevel": 650,
            "spendToNextLevel": 105,
            "totalPointsToNextReward": 0,
            "pointsToNextReward": 115
        },
        "availableCredit": 448.72
    }
}
```

Although examples of the languages used in the packet is provided herein, it is provided for purposes of clarity. It is possible that other languages and protocols may be utilized while remaining within the spirit and scope of the claims.

In addition, to speed up checkout, it is possible to utilize information from the credit account app to autofill a checkout aspect of the retail website. For example the app may provide automatic fill information from things such as, but not limited to, user name, a user shipping address, rewards certificate number and user contact information, e.g., phone number, email, fax, etc.

Thus, simple checkout not only provides a payment experience, but also a loyalty experience. E.g., an engagement with a customer and an account management experience that provides additional value to the customer prior to the actual checkout and purchase authorization. For example, during checkout the simple checkout will provide additional aspects such as loyalty aspects, e.g., reward status and progression, reward certificates, coupon redemption, and the like. There may also be engagement aspects such as, promotions, offers, push notifications, customer web chat, and the like. These engagement aspects can further be deployed as to reach customers who may have abandoned cart, etc. In other words, a customer has value before the authorization providing a unique benefit and seamless experience. In yet another embodiment, there may be account management aspects such as available credit and balance, credit increase, quick bill pay, and other aspects so customer may fulfill such needs within the shopping experience and without the need to go to other account management channels.

One embodiment integrates rewards information with the credit account app into the purchase. For example, as a customer is getting ready to purchase, the credit account app will look at rewards information such as, offers, coupons, and the like. The rewards information may be related to rewards offered by the retailer where the purchase is being made, the credit account provider providing the funds, or the like. Another example is the scenario where a customer is ready to checkout and clicks on the simple checkout button for payment. The customer does not need to enter credentials because they have already enabled auto-login features from the prior setup or prior use. In one embodiment, the auto login feature can be enabled using single sign-on with retail site, device identification and/or other customer remembrance feature. This is different than other pay with points solutions where a merchant has to call the rewards API to get information and apply points. Instead, embodiments described herein do this automatically because the customer is interacting with the card issuer directly.

In addition, the technology is well suited to utilize the information of the credit account in conjunction with a purchase request of the retail application to adjust a user's credit limit based on the purchase request. For example, if a user is looking at purchasing something for 500 dollars but has less than 500 dollars in credit remaining on their account. One embodiment would determine the difference and perform a credit reevaluation. In so doing, the result of the credit reevaluation may be an increase in the user's credit limit to allow a purchase of a product at an amount higher than a user's present credit limit. In general, the determination may be based on a credit check, the user's credit history, an intended credit increase by the financial account, applicable credit laws & regulations and the like. Current embodiments do not evaluate credit reevaluation and would decline purchase as an authorization.

In another embodiment, if the user is looking at purchasing something that is above the user's credit limit or remaining credit account available funds, one embodiment would alert the retailer of a purchase opportunity that may be missed and allow the retailer to offer something similar but within the customer's available credit. In another embodiment, if the customer is just browsing, the retailer may be able to offer items of interest to the customer based on the customer's rewards activity, purchase history, browsing history, available credit, or the like.

In addition, as stated herein, one embodiment would also add a reward to the purchase; for example, the customer may have a reward certificate. Thus, one embodiment provides the certificate number and value without additional merchant integration. As such, the merchant can apply it during the checkout experience and it is seamless for the customer to apply the certificate to the final purchase amount. No additional retailer work to retrieve loyalty information.

When the app notices the reward is related to the purchase, the app may remind the customer of the offer, or choose one from multiple offers or even offer the reward to the customer at the time of sale. This can be used to enhance ease of use and provide a sense of loyalty that the client will appreciate. Moreover, the app will help new customers apply to become clients, will provide opportunity to obtain a credit account, join a rewards program, etc. In another embodiment, integrated customer acquisition, e.g., a customer applying for a credit account is a different situation and is not available within the application.

Further, because authenticating into the system directly, e.g., via the app or the like, there is the opportunity to do account management and the like that is beyond just authorization. E.g., pay option for balance, contact customer care, make a comment, customer chat before, during or after purchase, etc. Moreover, payment tokens may be provided at time of sale that can add security to the sale. In addition, the financial side, the retail side or both sides can track metrics, purchase data, what was put in the cart and taken out, not purchased, replaced, etc. since the information is known before the transaction, during the transaction and after the transaction. Such information may be valuable in seeing what customers look at but don't purchase; what they select instead; if they look at different retailers before making a purchase; etc.

Thus, simple checkout provides cardholder benefits such as customer convenience of checking out without the need for a physical card or remembering their card number. Use of familiar account center credentials enhances customer ease of use. Auto filled personal shopping data expedites checkout process and enhances customer experience. Cardholder has the ability to retrieve forgotten account credentials or register new if not previously registered. No need to update new card information when card reissued, as Simple Checkout retrieves the latest card data. Customer will have a view of their rewards status and the ability to redeem rewards. Similar experience across mobile and desktop platforms provides for a consistent seamless experience.

Simple checkout also provides brand benefits such as enhanced customer satisfaction with a frictionless checkout experience. In addition, there is likely a reduction of cart abandonment with support for guest checkout mode. Further, if the widget is utilized, it would elevate the brand's own private label on par or ahead of competing tender services. It further enhances brand awareness through a branded widget and increased private label usage and may increase revenue and profit margin by driving tender towards brand's own private label. Additional card account data allows brands to be creative in increasing basket size during checkout process. Easy integration enables shorter implementation with minimum effort on client's part and positions the brand for future migration to payment tokens and away from storing card numbers.

Simple checkout additionally provides credit account provider benefits such as elevating private label experience to be on par or ahead of competing checkout services. It further increases private label card visibility and awareness among customers while protecting and increasing private label tender share with increased card usage.

Example Computer System

Figure 4:
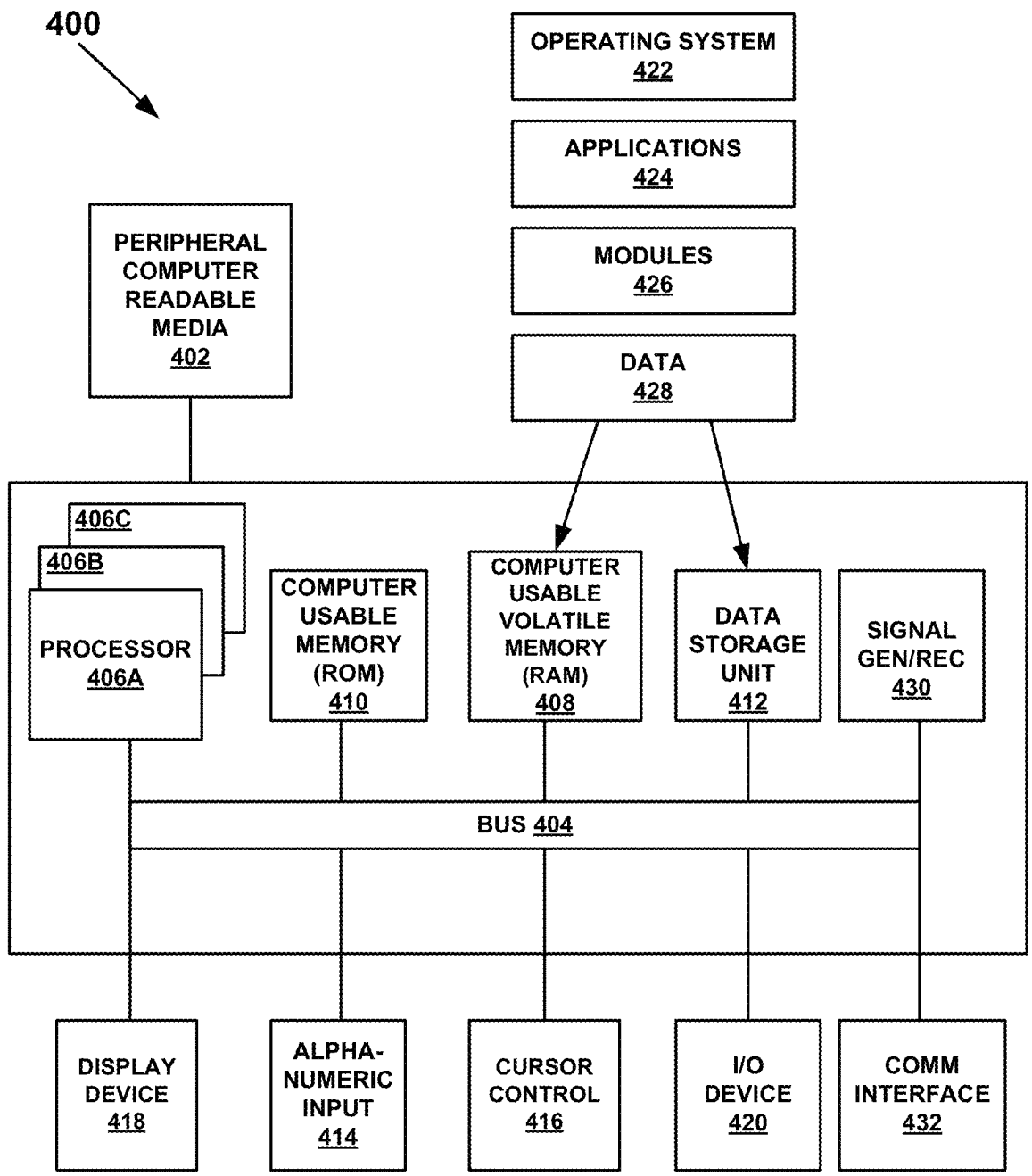
FIG. 4 is a block diagram of an example computer system with which or upon which various embodiments of the present invention may be implemented.

With reference now to FIG. 4, a block diagram of an example computer system with which or upon which various embodiments of the present invention may be implemented is shown. It should be appreciated that one or more of the embodiments may be composed of computer-readable and computer-executable instructions that reside, for example, in a non-transitory computer-readable medium.

Although FIG. 4 illustrates an example computer system 400 used in accordance with embodiments of the present technology. It is appreciated that system 400 of FIG. 4 can operate on or within a number of different computer systems including general purpose networked computer systems, computer-readable and computer-executable instructions that reside, for example, in non-transitory computer-readable medium, embedded computer systems, routers, switches, server devices, user devices, various intermediate devices/artifacts, stand-alone computer systems, mobile phones, personal data assistants, televisions and the like.

Computer system 400 of FIG. 4 is well adapted to having peripheral computer readable media 402 such as, for example, an external storage drive, a compact disc, a flash drive, a thumb drive, a wireless radio enabled device, and the like coupled thereto.

Computer system 400 of FIG. 4 includes an address/data/control bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic disk drive, optical disk drive, solid state drive (SSD), and the like) coupled to bus 404 for storing information and instructions. Computer system 400 also includes an optional alpha-numeric input device 414 including alphanumeric and function keys coupled to bus 404 for communicating information and command selections to processor 406A or processors 406A, 406B, and 406C. Computer system 400 also includes an optional cursor control device 416 coupled to bus 404 for communicating user input information and command selections to processor 406A or processors 406A, 406B, and 406C. Optional cursor control device may be a touch sensor, gesture recognition device, and the like. Computer system 400 of the present embodiment also includes an optional display device 418 coupled to bus 404 for displaying information.

Referring still to FIG. 4, optional display device 418 of FIG. 4 may be a liquid crystal device, cathode ray tube, OLED, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 also includes an I/O device 420 for coupling system 400 with external entities. For example, in one embodiment, I/O device 420 is a modem for enabling wired or wireless communications between system 400 and an external network such as, but not limited to, the Internet or intranet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple system 400 with another device, such as a mobile telephone, radio, or computer system.

The computing system 400 is only one example of a suitable computing environment and is not intended to suggest any limitation as to the scope of use or functionality of the present technology. Neither should the computing environment be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method comprising:
   initiating, on a customer's computing device, a credit account native mobile application (credit account app);
   accessing, via said customer's computing device, a retail website hosted by a second computing device;
   selecting, via said customer's computing device, an item for purchase on said retail website;
   obtaining, at the credit account app on said customer's computing device and from the retail website hosted by the second computing device, information about said item;
   providing, from the credit account app on said customer's computing device and to a financial server, a purchase request for said item, said purchase request including said information about said item, wherein each of said customer's computing device, said second computing device, and said financial server are separate entities;
   determining, at said financial server, a cost of said item is higher than a customer's remaining credit account available funds;
   receiving at said customer's computing device, a denial from said financial server when said cost of said item is higher than said customer's remaining credit account available funds;
   providing, from said financial server and to said retail website via said credit account native mobile application, said customer's remaining credit account available funds;
   automatically requesting from said retail website, via said credit account native mobile application, a different item similar to said item, wherein said different item is within said customer's remaining credit account available funds;
   receiving, at the credit account app on said customer's computing device and from said financial server, a payment card data and a purchase authorization information for said different item;
   generating, at said credit account app on said customer's computing device, an encrypted customer payload comprising: said payment card data, said purchase authorization information for said different item, a session key, and a shipping address for a customer;
   signing, at said credit account app on said customer's computing device, said encrypted customer payload with a digital signature;
   providing, from the credit account app on the customer's computing device and to the retail website hosted on said second computing device, said encrypted customer payload with said digital signature;
   validating, at said retail website hosted on said second computing device, said digital signature;
   decrypting, at said retail website hosted on said second computing device, said encrypted customer payload;
   completing a purchase of said different item, at said retail website hosted on said second computing device, with said information provided in said decrypted customer payload; and
   automatically utilizing, at said retail website hosted on said second computing device, said shipping address for said customer provided in said decrypted customer payload as a delivery address for said different item.

2. The method of claim 1 further comprising:
   determining said item has been selected when said item is added to a shopping cart of the retail website.

3. The method of claim 1 further comprising:
   displaying a plurality of available reward options via the credit account app, the plurality of available reward options being applicable to the purchase; and
   providing a customer option for selecting one or more of the plurality of available reward options to be applied to the purchase.

4. The method of claim 3, further comprising:
   integrating, at said credit account app, a selected one or more of the plurality of available reward options into said encrypted customer payload.

5. The method of claim 1 further comprising:
   automatically providing a real-time account information, including any changes to an account number due to an account number update, in said purchase authorization information provided to said credit account app on the customer's computing device from said financial server.

6. The method of claim 1, further comprising:
   determining, at said financial server, said cost of the item is higher than said customer's remaining credit account available funds;
   automatically performing a credit reevaluation at said financial server;
   receiving at said customer's computing device, said purchase authorization information from said financial server, when said customer qualifies for a credit limit increase; and
   receiving at said customer's computing device, said denial from said financial server when said customer does not qualify for said credit limit increase.

7. A system, comprising:
   a computing system hosting a retail website;
   a financial server; and
   a customer's computing device, wherein each of said computing system hosting said retail website, said financial server, and said customer's computing device are separate entities, said customer's computing device comprising:
      a memory for storing instructions;
      a communication capability; and
      at least one processor to:
         access said retail website;
         launch a credit account native mobile application (credit account app);
         receive a log in to the credit account app;
         receive a selection of an item to purchase at the retail website;
         request from the computing system hosting said retail website, information about said item, said information comprising purchase information for said item;
         receive from the computing system hosting said retail website, said information about said item;
         automatically provide, from the credit account app and to said financial server, a purchase authorization request for said item, said purchase authorization request including said information for said item;
         determine a cost of said item is higher than a customer's remaining credit account available funds;
         receive a denial from said financial server when said cost of said item is higher than said customer's remaining credit account available funds;
         provide, from said financial server and to said retail website via said credit account native mobile application, said customer's remaining credit account available funds;

automatically request from said retail website, via said credit account native mobile application, a different item similar to said item, wherein said different item is within said customer's remaining credit account available funds;

receive, at said credit account app and from the financial server, a payment card data and a purchase authorization information for said different item;

generate, via said credit account app, an encrypted customer payload comprising: said payment card data, said purchase authorization information for said different item, a session key, and a shipping address for a customer;

sign, via said credit account app, said encrypted customer payload with a digital signature;

provide said encrypted customer payload with said digital signature from the credit account app to the retail website;

validate, at said retail website, said digital signature;

decrypt, at said retail website, said encrypted customer payload;

complete, at said retail website, a purchase of said different item with said information provided in said decrypted customer payload; and automatically utilize, at said retail website, said shipping address for said customer in said decrypted customer payload as a delivery address for said different item.

8. The system of claim 7 wherein said at least one processor of said customer's computing device is further to:
receive said selection of said item to purchase at said retail website when said item is placed in a shopping cart of the retail website.

9. The system of claim 7 wherein said at least one processor of said customer's computing device is further to:
enable a one click feature that allows a login to the credit account app without requiring additional credentials.

10. The system of claim 7 wherein said at least one processor of said customer's computing device is further to:
determine, at said financial server, a cost of the item is higher than a present credit amount available to said customer; and
provide an indication on a display of said customer's computing device, the indication identifying a discrepancy between the cost of the item and a present credit amount available to said customer.

11. The system of claim 7, wherein the at least one processor of the customer's computing device is further to:
determine said cost of the item is higher than said customer's remaining credit account available funds;
automatically request a credit reevaluation from said financial server;
receive said purchase authorization information from said financial server, when said customer qualifies for a credit limit increase; and
receive said denial from said financial server when said customer does not qualify for said credit limit increase.

12. The system of claim 7, wherein the at least one processor of the customer's computing device is further to:
provide from said credit account app, at least one available reward, the at least one available reward applicable to the purchase; and
integrate the at least one available reward into the encrypted customer payload.

13. A non-transitory computer-readable medium for storing instructions, the instructions comprising:

one or more instructions which, when executed by one or more processors of a customer's mobile device, cause one or more processors to:
access a retail website hosted by a second computing device;
launch a credit account native mobile application (credit account app);
receive credentials to log into the credit account app;
log in to the credit account app;
receive an indication from said second computing device that an item has been added to a shopping cart;
provide a request to said second computing device for information about said item;
receive from the second computing device said information about said item;
automatically provide, to a credit account server, a purchase authorization request for said item, said purchase authorization request including said information about said item, wherein each of said customer's mobile device, said second computing device, and said credit account server are separate entities;
receive a denial from said financial server when said cost of said item is higher than said customer's remaining credit account available funds, wherein said financial server provides a customer's remaining credit account available funds to said retail website via said credit account native mobile application;
automatically receive from said retail website a different item similar to said item, wherein said different item is within said customer's remaining credit account available funds;
receive, from the credit account server, a payment card data and a purchase authorization information for said different item;
generate, an encrypted customer payload comprising: said payment card data, said purchase authorization information for said item, a session key, and a shipping address for a customer;
sign said encrypted customer payload with a digital signature; and
provide said encrypted customer payload to the retail website hosted by said second computing device wherein said encrypted customer payload includes enough information for said retail website to automatically complete a shipping information and a purchase of said different item.

14. The non-transitory computer-readable medium of claim 13, where the instruction further comprise:
one or more instructions which, when executed by said one or more processors of said customer's mobile device, cause said one or more processors to:
determine, at said credit account server, said cost of the item is higher than said customer's remaining credit account available funds;
automatically perform a credit reevaluation at said credit account server;
receive at said customer's mobile device, said purchase authorization information from said credit account server, when said customer qualifies for a credit limit increase; and
receive at said customer's mobile device, said denial from said credit account server when said customer does not qualify for said credit limit increase.

15. The non-transitory computer-readable medium of claim 13, where the instructions further comprise:
one or more instructions which, when executed by said one or more processors of said customer's mobile device, cause said one or more processors to:
provide from said credit account app, at least one available reward, the at least one available reward applicable to the purchase; and
integrate the at least one available reward into the encrypted customer payload.

* * * * *